United States Patent
Zhang et al.

(10) Patent No.: US 10,412,406 B2
(45) Date of Patent: Sep. 10, 2019

(54) METHOD AND APPARATUS FOR DERIVING TEMPORAL MOTION VECTOR PREDICTION

(71) Applicants: MediaTek Singapore Pte. Ltd., Singapore (SG); Kai Zhang, Beijing (CN); Jicheng An, Beijing (CN)

(72) Inventors: Kai Zhang, Beijing (CN); Jicheng An, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 1 day.

(21) Appl. No.: 15/564,206

(22) PCT Filed: Apr. 13, 2016

(86) PCT No.: PCT/CN2016/079141
§ 371 (c)(1),
(2) Date: Oct. 4, 2017

(87) PCT Pub. No.: WO2016/165617
PCT Pub. Date: Oct. 20, 2016

(65) Prior Publication Data
US 2018/0255316 A1    Sep. 6, 2018

(30) Foreign Application Priority Data
Apr. 14, 2015  (WO) ................ PCT/CN2015/076542

(51) Int. Cl.
*H04N 19/30* (2014.01)
*H04N 19/31* (2014.01)
(Continued)

(52) U.S. Cl.
CPC ............ *H04N 19/52* (2014.11); *H04N 19/30* (2014.11); *H04N 19/31* (2014.11);
(Continued)

(58) Field of Classification Search
CPC ...... H04N 19/52; H04N 19/31; H04N 19/503; H04N 19/30; H04N 19/70; H04N 19/176
(Continued)

(56) References Cited

U.S. PATENT DOCUMENTS

| | | |
|---|---|---|
| 2012/0008688 A1 | 1/2012 | Tsai et al. |
| 2012/0134416 A1* | 5/2012 | Lin .................. H04N 19/52 375/240.16 |

(Continued)

FOREIGN PATENT DOCUMENTS

| | | |
|---|---|---|
| WO | WO 2012/171442 A1 | 12/2012 |
| WO | WO 2013/109975 A1 | 7/2013 |
| WO | WO 2014/106346 A1 | 7/2014 |

OTHER PUBLICATIONS

International Search Report dated Jul. 1, 2016, issued in application No. PCT/CN2016/079141.

*Primary Examiner* — Marnie A Matt
(74) *Attorney, Agent, or Firm* — McClure, Qualey & Rodack, LLP

(57) ABSTRACT

A method and apparatus for encoding or decoding a motion vector (MV) of a current block of a current picture using advanced temporal motion vector prediction are disclosed. At least two collocated pictures are selected from a set of reference pictures of the current picture. One or more TMVPs are derived based on reference motion vectors (MVs) associated with collocated reference blocks of the collocated pictures. A motion vector prediction candidate set including one or more TMVPs is then determined. The current block is encoded or decoding using the motion vector prediction candidate set. The reference motion vectors (MVs) are scaled before the reference motion vectors (MVs) are used to derive the TMVPs.

20 Claims, 4 Drawing Sheets

(51) Int. Cl.
*H04N 19/52* (2014.01)
*H04N 19/70* (2014.01)
*H04N 19/503* (2014.01)
*H04N 19/176* (2014.01)

(52) U.S. Cl.
CPC .......... *H04N 19/503* (2014.11); *H04N 19/70* (2014.11); *H04N 19/176* (2014.11)

(58) Field of Classification Search
USPC .................................................. 375/240.12
See application file for complete search history.

(56) References Cited

U.S. PATENT DOCUMENTS

| | | | |
|---|---|---|---|
| 2012/0236942 A1* | 9/2012 | Lin .................. | H04N 19/52 375/240.16 |
| 2013/0188716 A1* | 7/2013 | Seregin ............ | H04N 19/56 375/240.16 |
| 2013/0243092 A1* | 9/2013 | Sugio ............... | H04N 19/52 375/240.16 |
| 2014/0064374 A1* | 3/2014 | Xiu .................. | H04N 19/52 375/240.16 |
| 2014/0086325 A1* | 3/2014 | Chen ................ | H04N 19/52 375/240.14 |
| 2014/0301467 A1* | 10/2014 | Thirumalai ....... | H04N 19/597 375/240.16 |
| 2016/0366435 A1* | 12/2016 | Chien ............... | H04N 19/52 |

\* cited by examiner

METHOD AND APPARATUS FOR DERIVING TEMPORAL MOTION VECTOR PREDICTION

CROSS REFERENCE TO RELATED APPLICATIONS

The present invention claims priority to PCT Patent Application, Serial No. PCT/CN2015/076542, filed on Apr. 14, 2015. The PCT Patent Application is hereby incorporated by reference in its entirety.

FIELD OF THE INVENTION

The present invention relates to video coding. In particular, the present invention relates to coding techniques associated with derivation of temporal motion vector candidate and motion vector prediction candidate.

BACKGROUND AND RELATED ARTS

In video coding systems, spatial and temporal redundancy is exploited using spatial and temporal prediction to reduce the information to be transmitted. The spatial and temporal prediction utilizes decoded pixels from the same picture and reference pictures respectively to form prediction for current pixels to be coded. In a conventional coding system, side information associated with spatial and temporal prediction may have to be transmitted, which will take up some bandwidth of the compressed video data. The transmission of motion vectors for temporal prediction may require a noticeable portion of the compressed video data. To further reduce the bitrate associated with motion vectors, a technique called Motion Vector Prediction (MVP) has been used in the field of video coding. The MVP technique exploits the statistic redundancy among neighbouring motion vectors spatially and temporally. In the rest of this document, MVP may sometimes denote "motion vector prediction" and sometimes denote "motion vector predictor" according to contexts.

In High-Efficiency Video Coding (HEVC) development, a technique named Advanced Motion Vector Prediction (AMVP) is used to derive a motion vector predictor for a current motion vector. The AMVP technique uses explicit predictor signalling to indicate the MVP selected from a MVP candidate set. In HEVC, the MVP candidate set of AMVP includes spatial MVPs as well as a temporal MVP. The temporal MVP is derived based on motion vectors from a respective area (i.e., a collocated block) of a collocated picture. FIG. 1 illustrates an example of TMVP derivation, where the motion vector 112 from a collocated block 114 in a collocated picture 110 is used as a temporal MVP candidate. The MVP is used as one of the AMVP candidates for predicting the current motion vector 122 of the current block 124 in the current picture 120. The collocated picture is a reference picture of the current picture. The collocated block is a block corresponding to the current block. Usually it is the block at the same relative position in the collocated picture as the current block in the current picture.

When TMVP is used to predict the current motion vector (MV), it should be scaled based on the time distance between pictures. FIG. 2 illustrates an example of TMVP scaling, where the motion vector 212 from a collocated block 214 in a collocated picture 210 is scaled before it is used as one of the TMVP candidates for predicting the current motion vector 222 of the current block 224 in the current picture 220. The scaling can be based on time distance as measured by picture order count (POC). In FIG. 2, the TMVP 212 points from the collocated picture to the reference picture 230. On the other hand, the current motion vector points from the current picture 220 to the reference picture 240. The TMVP has to be scaled before it is used as one of the AMVP candidates for predicting the current motion vector.

There is also a Merge mode used in various advanced video coding, where the motion vector information of a current block can share the motion information of a previously coded block. In this case, information regarding the merging candidate needs to be identified. However, there is no need to transmit the motion information for the current block. Accordingly, the Merge mode can achieve a higher degree of coding efficiency. The merging candidates can be derived in a similar fashion as the AMVP candidate.

In H.264/AVC, the collocated picture is a fixed reference picture in the reference list. In H.265/HEVC, the encoder can choose any reference picture in the reference list as the collocated picture for the current picture. The information related to the reference picture selection is signalled from the encoder to the decoder in the slice header.

It is desirable to explore techniques to improve the efficiency of temporal motion vector prediction.

BRIEF SUMMARY OF THE INVENTION

A method and apparatus for encoding or decoding a motion vector (MV) of a current block of a current picture using motion vector prediction are disclosed. At least two collocated pictures are selected from a set of reference pictures of the current picture. One or more TMVPs are derived based on reference motion vectors (MVs) associated with collocated reference blocks of the collocated pictures. A motion vector prediction candidate set including one or more TMVPs is then determined. The current block is encoded or decoding using the motion vector prediction candidate set. The reference motion vectors (MVs) are scaled before the reference motion vectors (MVs) are used to derive the TMVPs.

The total picture number corresponding to the collocated pictures can be fixed to a predetermined value. Alternatively, the total picture number corresponding to the collocated pictures can be determined by the encoder. The total picture number corresponding to the collocated pictures can be signalled from the encoder to the decoder in video parameter set (VPS), sequence parameter set (SPS), picture parameter set (PPS), slice header, coding unit (CU), or prediction unit (PU). The collocated pictures can be located at fixed positions in a reference picture list. Alternatively, the collocated pictures can be selected by the encoder and positions of the collocated pictures in a reference picture list can be signalled from the encoder to the decoder in VPS, SPS, PPS, slice header, CU, or PU.

In one embodiment, one reference motion vector associated with any of the collocated reference blocks for each collocated picture can be selected for deriving one or more TMVPs. The encoder may select the TMVP from any of the collocated reference blocks for each collocated picture and the encoder signals the selection information in a bitstream.

In another embodiment, N TMVPs can be selected from different collocated reference blocks in different collocated pictures. The N TMVPs can be inserted into the motion vector prediction candidate set corresponding to a merging candidate list or an advanced motion vector prediction (AMVP) candidate list, and N is a positive integer. The N TMVPs can be selected from different collocated reference blocks in different collocated pictures according to a selected checking order. When N is equal to one, the reference motion vectors of the collocated blocks in a first collocated picture are checked first. If any reference motion vectors associated with the collocated blocks is found, the reference motion vector is selected as the TMVP. Otherwise, the TMVP is selected from a next collocated picture. When N is equal to two, if a first motion vector that is a firstly available reference motion vector associated with one checked collocated block of the first collocated picture in the selected checking order is found, the first motion vector is selected as the first TMVP and checking remaining collocated blocks of the first collocated picture is skipped. The collocated blocks of a second collocated picture are then checked in the selected checking order. If a second motion vector that is a firstly available reference motion vector associated with one checked collocated block of the second collocated picture in the selected checking order is found, the second motion vector is selected as the second TMVP and checking remaining collocated blocks of the second collocated picture is skipped.

In yet another embodiment, the reference motion vectors (MVs) associated with the collocated reference blocks of the collocated pictures are allowed to be stored in a spatial compressed format, and different collocated pictures may use different compression ratios. The encoder may transmit one or more syntax elements to specify whether the reference motion vectors (MVs) are stored in the spatial compressed format. The syntax elements may be signalled in a VPS, SPS, PPS, or slice header.

In yet another embodiment, a first TMVP and a second TMVP can be combined to form a third TMVP with a third motion vector, and the third motion vector is derived by averaging a first motion vector obtained by scaling the first TMVP and a second motion vector obtained by scaling the second TMVP. Also, N TMVPs can be combined to form a new TMVP with a new motion vector, and the new motion vector is derived by averaging N motion vectors obtained by scaling the N TMVPs respectively. The reference motion vectors (MVs) associated with the collocated reference blocks of the collocated pictures can be scaled to a fixed time-distance before the reference motion vectors (MVs) are stored in a buffer. In this case, the reference picture indices for the reference motion vectors (MVs) do not need to be stored.

In yet another embodiment, a number of remaining candidates of the motion vector prediction candidate set is determined. If the number of remaining candidates is less than or equal to a threshold, only one TMVP is included in the motion vector prediction candidate set, otherwise two or more TMVPs are included in the motion vector prediction candidate set.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
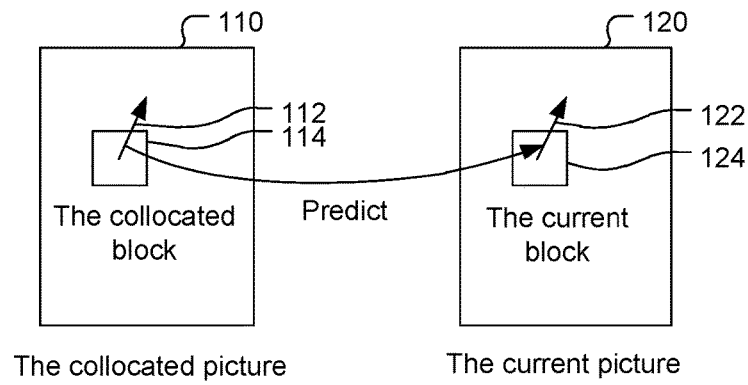
FIG. 1 illustrates an example of TMVP derivation, where the motion vector is fetched from a collocated block in a collocated picture.
Figure 2:
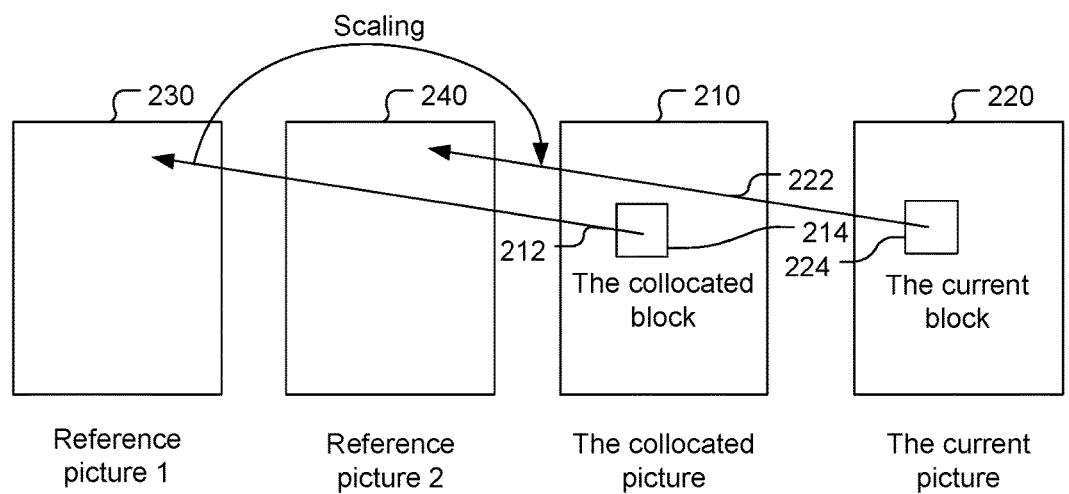
FIG. 2 illustrates an example of TMVP scaling, where the motion vector from a collocated block in a collocated picture is scaled before it is used as one of the AMVP candidates for predicting the current motion vector of the current block in the current picture.
Figure 3:
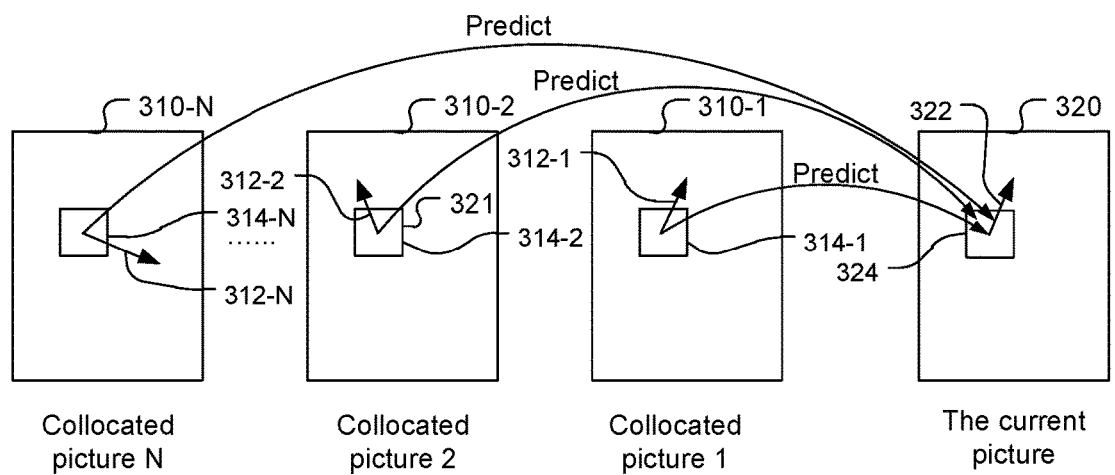
FIG. 3 illustrates an example of advanced temporal motion vector prediction according to the present invention, where N collocated pictures are used to derive the TMVP and N≥2.

An advanced temporal motion vector prediction (ATMVP) method is disclosed to improve the coding efficiency. FIG. 3 illustrates an example of advanced temporal motion vector prediction according to the present invention, where N collocated pictures are used to derive the TMVP and N≥2. The motion vector 312-1 from a collocated block 314-1 in a collocated picture 310-1, the motion vector 312-2 from a collocated block 314-2 in a collocated picture 310-2, through motion vector 312-N from a collocated block 314-N in a collocated picture 310-N are used to derive the TMVP as one of the AMVP candidates for predicting the current motion vector 322 of the current block 324 in the current picture 320.

In one embodiment, the number of collocated pictures can be a predetermined number, such as 2, 3, 4, etc.

In another embodiment, the number of collocated pictures can be determined by the encoder and signalled from the encoder to the decoder. It can be signalled in video parameter set (VPS), sequence parameter set (SPS), picture parameter set (PPS), slice header, coding unit (CU), or prediction unit (PU).

In one embodiment, the collocated pictures can be placed at fixed positions in the reference picture list.

In another embodiment, the collocated pictures can be chosen by the encoder and their positions in the reference picture list can be signalled from the encoder to the decoder. It can be signalled in video parameter set (VPS), sequence parameter set (SPS), picture parameter set (PPS), slice header, coding unit (CU), or prediction unit (PU).

An exemplary syntax table for signalling the collocated pictures is shown below.

TABLE 1

|  | Note |
|---|---|
| col_pic_num | (1-1) |
| for( col_pic_idx = 0; col_pic_idx < col_pic_num; col_pic_idx++ ){ | |
| col_pic_list[col_pic_idx] | (1-2) |
| col_pic_refidx[col_pic_idx] | (1-3) |
| } | |

As shown in the above table, a new syntax element col_pic_num is signalled as shown in Note (1-1) to specify the number of collocated reference pictures used. For each collocated reference picture, the reference list col_pic_list[col_pic_idx] and reference picture index col_pic_refidx[col_pic_idx] are signalled as indicated by Notes (1-2) and (1-3).

Figure 4:
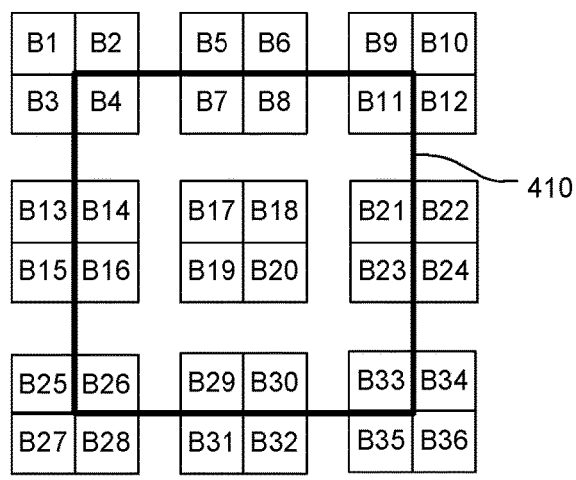
FIG. 4 illustrates exemplary collocated blocks, which can be within the 'original collocated block' or spatial neighbouring blocks of the 'original collocated block'.

One or more collocated blocks in each collocated picture can be used to derive the TMVP and the TMVP can be fetched from any of those collocated blocks. FIG. 4 illustrates exemplary collocated blocks from B1 through B36, which can be within the "original collocated block" 410 or spatial neighbouring blocks of the "original collocated block". The original collocated block represents the block at the same relative position in the collocated picture as the current block in the current picture.

The encoder can choose the TMVP from any collocated block in any collocated picture. Furthermore, the information of TMVP related to the corresponding collocated block and the collocated picture can be signalled from the encoder to the decoder. The information can be signalled in slice header, coding unit (CU), or prediction unit (PU).

In one embodiment, N TMVPs from different collocated blocks in different collocated pictures can be inserted into the merging candidate list as N merging candidates.

In one embodiment, N TMVPs from different collocated blocks in different collocated pictures can be inserted into the advanced motion vector prediction (AMVP) candidate list as N AMVP candidates.

Figure 5:
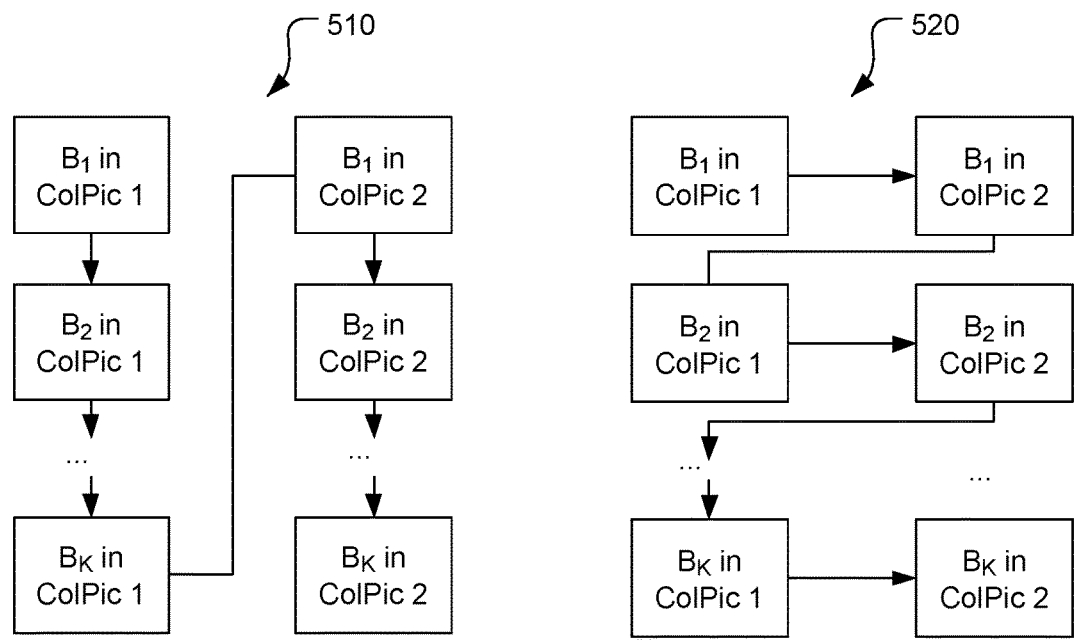
FIG. 5 illustrates two exemplary checking orders for N TMVPs in two different collocated pictures.

The N TMVPs can be fetched by checking different collocated blocks in different collocated pictures in any checking order. When enough TMVPs are derived, the checking process may be terminated. FIG. 5 illustrates two exemplary checking orders for N TMVPs in two different collocated pictures, where the N TMVPs are selected from the K collocated blocks (i.e., $B_1, B_1, \ldots, B_K$) in two collocated pictures (i.e., ColPic 1 and ColPic 2). First checking order 510 checks all collocated blocks in collocated picture ColPic 1 and then checks all collocated blocks in collocated picture ColPic 2. Second checking order 520 checks first collocated block in all collocated pictures and then moves to the next collocated block in all collocated pictures. According to checking order 520, for the collocated block at each location, the checking order is from the first picture to the last picture.

For example, N can be set to 1 and in this case, at most one TMVP can be used in the merging candidate list or AMVP candidate list. Collocated blocks in a first collocated picture can be checked first. If motion vectors can be found in collocated blocks in the first collocated picture, one or more of them will be used to derive the TMVP. Otherwise, collocated blocks in a second collocated picture will be checked.

In another example, N can be set to 2 and in this case, at most 2 TMVPs are included in the merging candidate list or AMVP candidate list. Collocated blocks in a first collocated picture can be checked first in order. If one motion vector can be found in a collocated block in the first collocated picture, it will be chosen as the first TMVP. Checking for other collocated blocks in the first collocated picture will be skipped. Then, collocated blocks in a second collocated picture should be checked in order. If one motion vector can be found in a collocated block in the second collocated picture, it will be chosen as the second TMVP.

In one embodiment, a number of remaining candidates of the motion vector prediction candidate set is determined. If the number of remaining candidates is less than or equal to a threshold, only one TMVP is included in the motion vector prediction candidate set, otherwise two or more TMVPs are included in the motion vector prediction candidate set. The number of TMVPs to be included in the motion vector prediction candidate set depends on the size of the motion vector prediction candidate set and the number of motion vector prediction candidates already included in the motion vector prediction candidate set.

The motion vectors can be compressed for different collocated pictures with different compression ratio. For example, motion vectors in collocated picture 1 can be compressed by 16 to 1 and motion vectors in collocated picture 2 can be compressed by 4 to 1. Motion vector compression for reducing required storage space has been used in video coding standards such as HEVC, where the motion vectors associated with blocks are stored at spatially reduced resolution. For example, the motion vectors for every two horizontal blocks and every two vertical blocks can be stored to achieve 4 to 1 compression. In the case that he motion vectors are stored for every four horizontal blocks and every four vertical blocks, a 16 to 1 compression can be achieved. The encoder can signal the information regarding whether to compress MVs and the compression ratio for each collocated picture to the decoder. The information can be signalled in VPS, SPS, PPS, or slice header. Such motion vector compression technique results in compressed form for motion vectors, which is referred as the spatial compressed format in this disclosure.

Different TMVPs from different collocated blocks in one or more collocated pictures can be combined to form a new TMVP.

Two motion vectors from two different collocated pictures can be combined and used as a new bi-prediction TMVP. For example, TMVP1 equal to MV1 and TMVP2 equal to MV2 can be combined as a new TMVP candidate TMVP 3, which utilizes bi-prediction. For TMVP3 with MV3 referring to a reference picture in reference list 0 and MV4 referring to a reference picture in reference list 1, MV3 can be obtained by scaling MV1 and MV4 can be obtained by scaling MV2.

In another example, TMVP1 equal to MV1 and TMVP2 equal to MV2 can be combined as a new TMVP candidate TMVP 3 with MV3, where MV3 is equal to (MV4+MV5)/2, MV4 can be obtained by scaling MV1 and MV5 can be obtained by scaling MV2.

In one example, TMVP1 equal to MV1, TMVP2 equal to MV2, . . . , and TMVPN equal to MVN can be combined as a new TMVP candidate TMVP_new with MV_new, where MV_new=(MV1'+MV2'+ . . . +MVN')/N, where MV1', MV2', . . . , MVN' can be obtained by scaling MV1, MV2, . . . MVN respectively.

Figure 6:
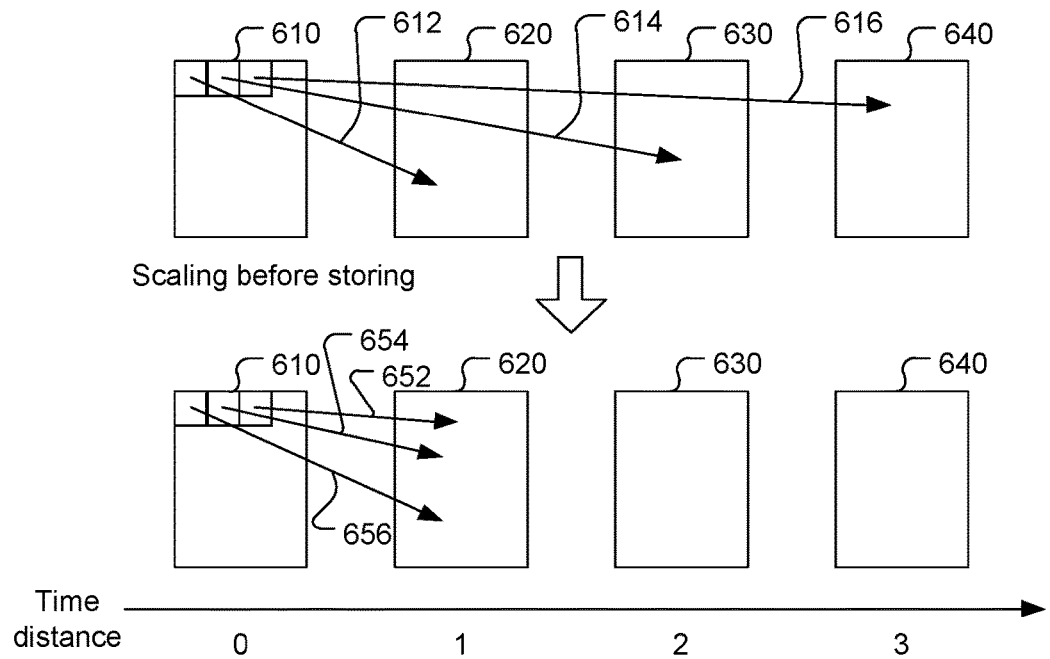
FIG. 6 illustrates an exemplary process of scaling all motion vectors in a collocated picture to a fixed time distance.

In one embodiment, MVs in a collocated picture can be scaled to a fixed time-distance before they are stored to the buffer. For example, MVs can all be scaled to a reference picture with time-distance=1. When the MVs are fetched from collocated pictures as TMVP, they can be scaled as if they refer to a reference picture with time-distance=1. FIG. 6 illustrates an exemplary process of scaling all motion vectors in a collocated picture to a fixed time distance. In FIG. 6, the three MVs (612, 614 and 616) of the collocated picture 610 point to three different reference pictures (620, 630 and 640). The MVs are scaled to point to the reference picture with time-distance equal to 1 (i.e., the reference picture 620). The scaled MVs (652, 654 and 656) are stored without the need to store the reference picture indices.

Figure 7:
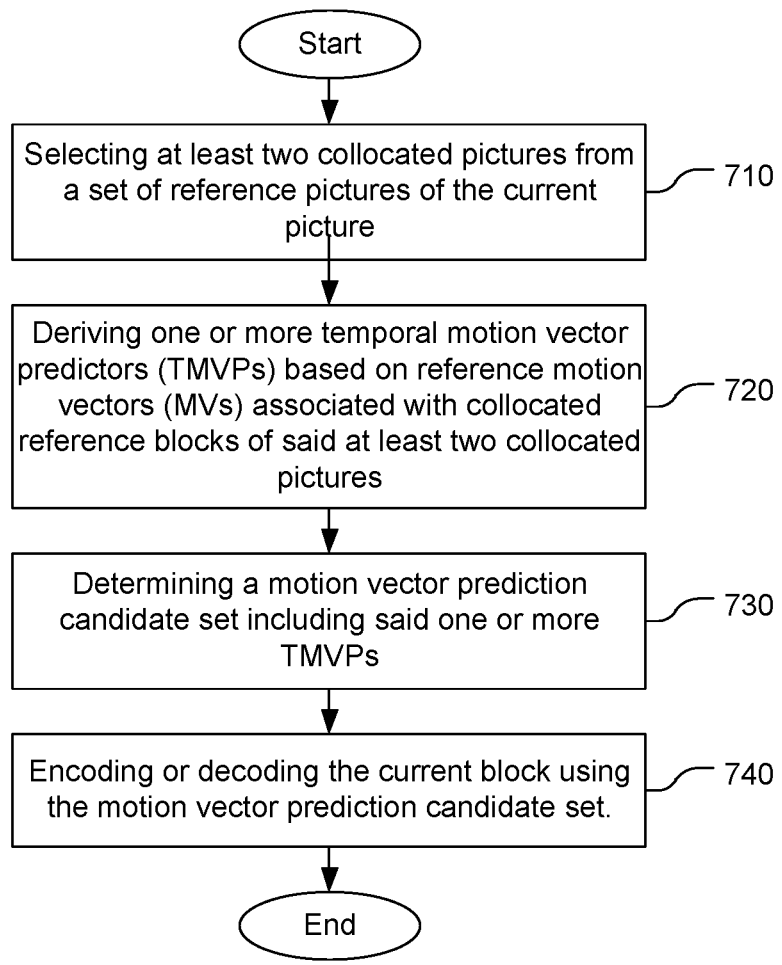
FIG. 7 illustrates an exemplary flowchart for a video coding system incorporating advanced temporal motion vector prediction (ATMVP) according an embodiment of the present invention.

FIG. 7 illustrates an exemplary flowchart for a video coding system incorporating advanced temporal motion vector prediction (ATMVP) according to an embodiment of the present invention. The system selects at least two collocated pictures from a set of reference pictures of the current picture in step 710. One or more TMVPs are derived based on reference motion vectors (MVs) associated with collocated reference blocks of said at least two collocated pictures in step 720. A motion vector prediction candidate set including said one or more TMVPs is determined in step 730. The motion vector prediction candidate set is then used to encode or decode the current block in step 740.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of encoding or decoding a motion vector (MV) of a current block of a current picture using motion vector prediction, comprising:
    selecting a plurality of collocated pictures from a set of reference pictures of the current picture for the current block;
    identifying a plurality of collocated reference blocks from the plurality of collocated pictures;
    obtaining a plurality of reference motion vectors (MVs) associated with the plurality of collocated reference blocks, wherein each reference MV is associated with a specific collocated reference block in a specific collocated picture among the plurality of collocated pictures and at least one collocated reference picture of the specific collocated picture;
    deriving one or more temporal motion vector predictors (MVPs) based on the plurality of reference motion vectors (MVs);
    determining a motion vector prediction candidate set including said one or more TMVPs; and
    encoding or decoding the current block using the motion vector prediction candidate set.

2. The method of claim 1, wherein said reference motion vectors (MVs) are scaled before said reference motion vectors (MVs) are used to derive said one or more TMVPs.

3. The method of claim 1, wherein a total picture number corresponding to said at least two collocated pictures is fixed to a predetermined value or wherein a total picture number corresponding to said at least two collocated pictures is determined by an encoder.

4. The method of claim 3, wherein the total picture number corresponding to said at least two collocated pictures is signalled from the encoder to a decoder in video parameter set (VPS), sequence parameter set (SPS), picture parameter set (PPS), slice header, coding unit (CU), or prediction unit (PU).

5. The method of claim 1, wherein said at least two collocated pictures are located at fixed positions in a reference picture list.

6. The method of claim 1, wherein said at least two collocated pictures are selected by an encoder and positions of said at least two collocated pictures in a reference picture list are signalled from the encoder to a decoder.

7. The method of claim 6, wherein the positions of said at least two collocated pictures in a reference picture list are signalled from the encoder to a decoder in video parameter set (VPS), sequence parameter set (SPS), picture parameter set (PPS), slice header, coding unit (CU), or prediction unit (PU).

8. The method of claim 1, wherein one reference motion vector associated with a collocated reference block for each collocated picture is selected for said deriving said one or more TMVPs.

9. The method of claim 8, wherein an encoder selects one TMVP associated with the selected reference motion vector and the encoder signals selection information in a bitstream.

10. The method of claim 1, wherein said deriving one or more TMVPs selects N TMVPs from different collocated reference blocks in different collocated pictures and said N TMVPs are inserted into the motion vector prediction candidate set corresponding to a merging candidate list or an advanced motion vector prediction (AMVP) candidate list, and wherein N is a positive integer.

11. The method of claim 10, wherein said deriving one or more TMVPs selects said N TMVPs from different collocated reference blocks in different collocated pictures according to a selected checking order.

12. The method of claim 10, wherein when N is equal to one, said deriving one or more TMVPs checks one or more collocated blocks in a first collocated picture first; if any reference motion vector associated with said one or more collocated blocks is found, said deriving one or more TMVPs selects the reference motion vector found as one TMVP; and otherwise said deriving one or more TMVPs selects one TMVP from a next collocated picture.

13. The method of claim 10, wherein when N is equal to two, said deriving one or more TMVPs checks one or more collocated blocks of a first collocated picture in a selected checking order; if a first motion vector that is a firstly available reference motion vector associated with one checked collocated block of the first collocated picture in the selected checking order is found, the first motion vector is selected as a first TMVP and checking remaining collocated blocks of the first collocated picture is skipped; said deriving one or more TMVPs then checks one or more collocated blocks of a second collocated picture in the selected checking order; and if a second motion vector that is a firstly available reference motion vector associated with one checked collocated block of the second collocated picture in the selected checking order is found, the second motion vector is selected as a second TMVP and checking remaining collocated blocks of the second collocated picture is skipped.

14. The method of claim 1, wherein said reference motion vectors (MVs) associated with the collocated reference blocks of said at least two collocated pictures are allowed to be stored in a spatial compressed format, and different collocated pictures are allowed to use different compression ratios.

15. The method of claim 14, wherein an encoder transmits one or more syntax elements to specify whether said reference motion vectors (MVs) associated with the collocated reference blocks of said at least two collocated pictures are stored in the spatial compressed format and said one or more syntax elements are signalled in a video parameter set (VPS), sequence parameter set (SPS), picture parameter set (PPS), or slice header.

16. The method of claim 1, wherein a first TMVP and a second TMVP are combined to form a bi-prediction TMVP with a first motion vector in a first reference list and a second motion vector in a second reference list, and wherein the first motion vector is obtained by scaling the first TMVP and the second motion vector is obtained by scaling the second TMVP.

17. The method of claim 1, wherein the reference motion vectors (MVs) associated with the collocated reference blocks of said at least two collocated pictures are scaled to a fixed time-distance before the reference motion vectors (MVs) are stored in a buffer.

18. The method of claim 17, wherein reference picture indices for the reference motion vectors (MVs) are not stored.

19. The method of claim 1, further comprising determining a number of remaining candidates of the motion vector prediction candidate set, if the number of remaining candidates is less than or equal to a threshold, only one TMVP is included in the motion vector prediction candidate set, otherwise two or more TMVPs are included in the motion vector prediction candidate set.

20. An apparatus for encoding or decoding a motion vector (MV) of a current block of a current picture using motion vector prediction, comprising one or more electronic circuits arranged to:
   select a plurality of collocated pictures from a set of reference pictures of the current picture for the current block;
   identify a plurality of collocated reference blocks from the plurality of collocated pictures;
   obtain a plurality of reference motion vectors (MVs) associated with the plurality of collocated reference blocks, wherein each reference MV is associated with a specific collocated reference block in a specific collocated picture among the plurality of collocated pictures and at least one collocated reference picture of the specific collocated picture;
   derive one or more temporal motion vector predictors (TMVPs) based on the plurality of reference motion vectors (MVs);
   determine a motion vector prediction candidate set including said one or more TMVPs; and
   encode or decode the current block using the motion vector prediction candidate set.

* * * * *